F. Smith,

Water Wheel,

Nº 10,253.   Patented Nov. 22, 1853.

Sheet 2-4 Sheets.
F. Smith,
Water Wheel,
N°10,253.  Patented Nov. 22, 1853.
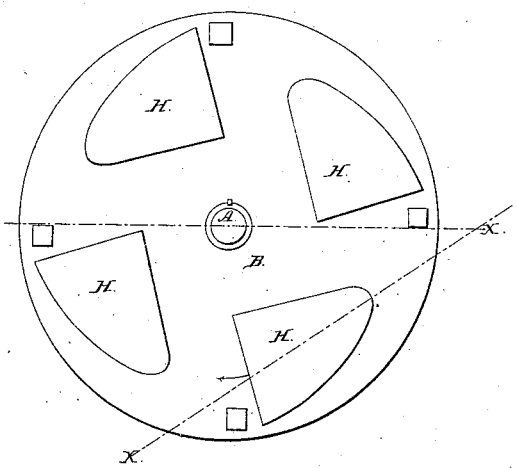
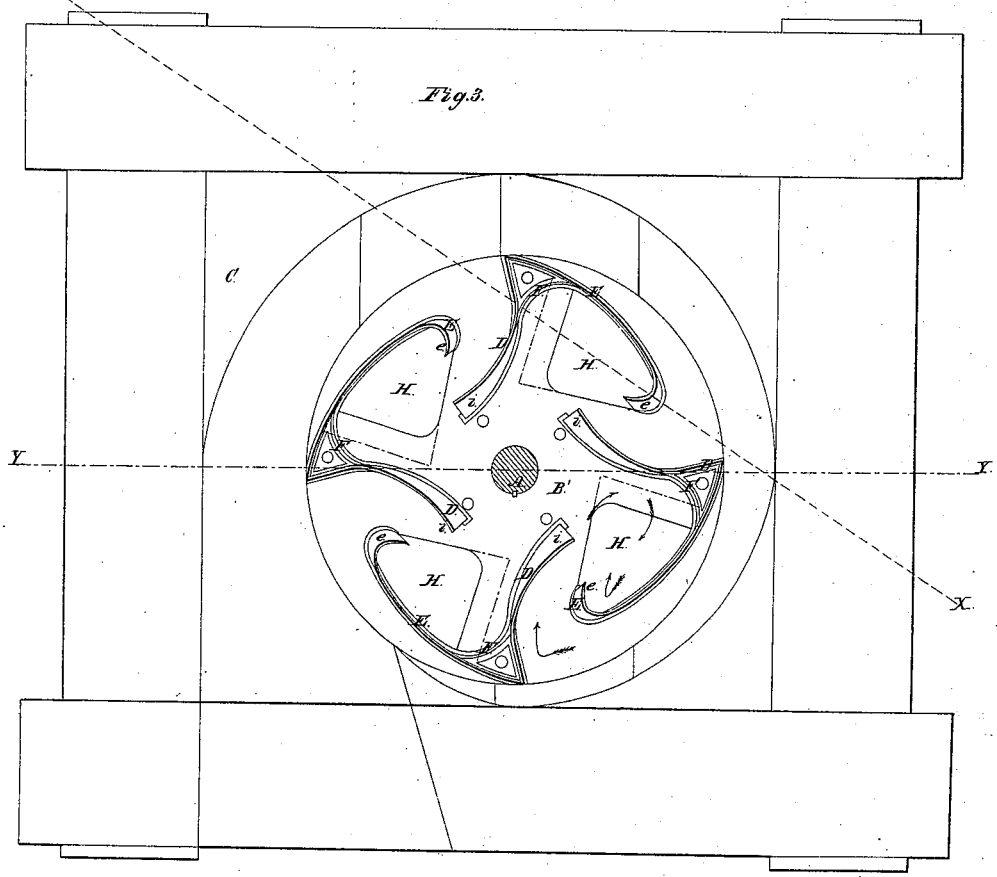

F. Smith,
Water Wheel,

№ 10,253. Patented Nov. 22 1853.

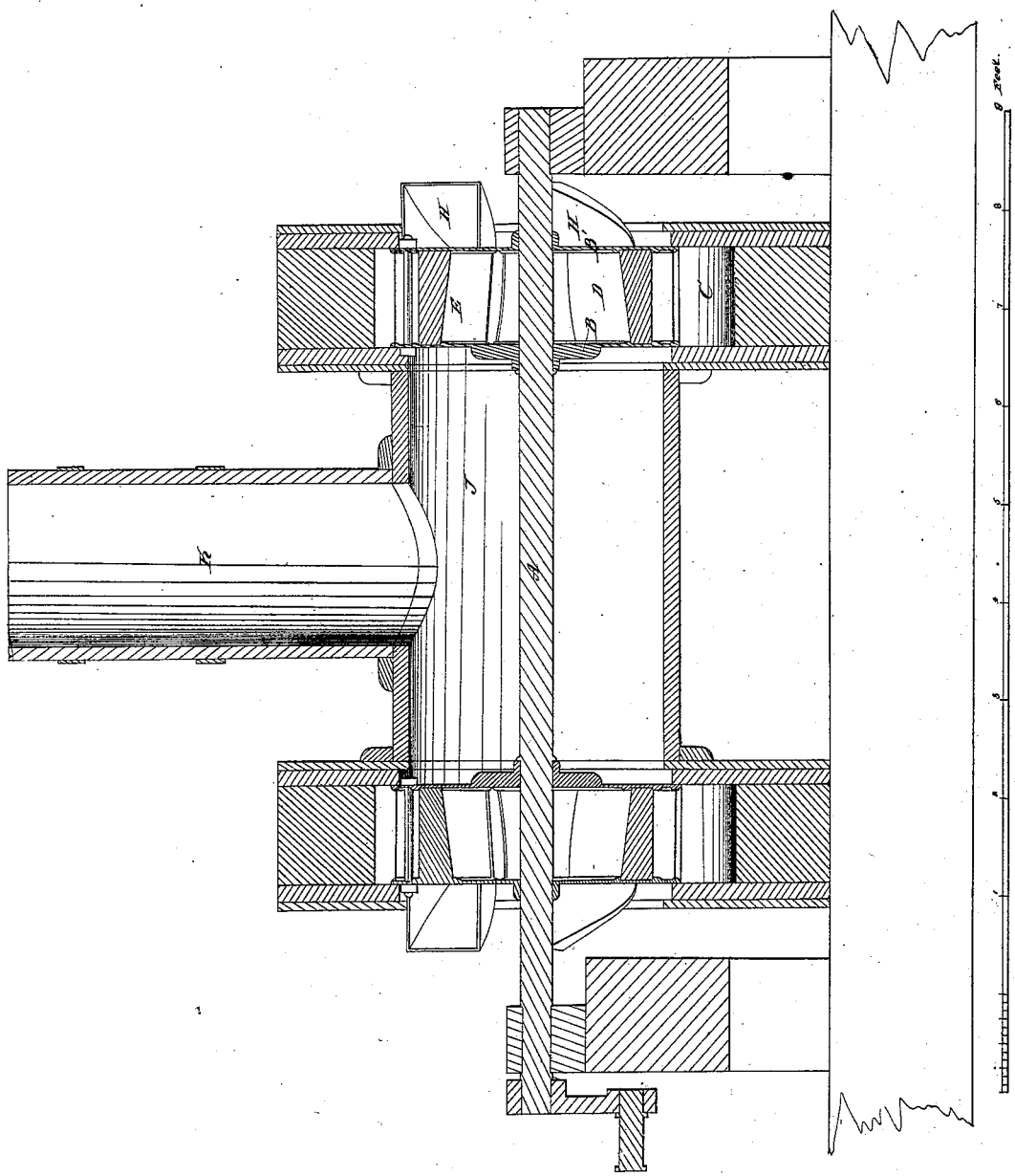

UNITED STATES PATENT OFFICE.

FREDERICK SMITH, OF PONTIAC, NEW YORK.

IMPROVED WATER-WHEEL.

Specification forming part of Letters Patent No. 10,253, dated November 22, 1853.

*To all whom it may concern:*

Be it known that I, FREDERICK SMITH, of Pontiac P. O., in the town of Evans, county of Erie, and State of New York, have invented certain Improvements in Water-Wheels, which improvements are described in the following specification, of which the accompanying drawings and letters of reference form a part, to enable competent workmen to make and use my invention.

My improvements consist in a series of buckets so arranged as to produce a twofold direct action, combined with a twofold reaction of the water upon the wheel, and in a new method of ventilating the wheel, by which I am enabled to secure a powerful draft of air through the wheel, which draft in its passage acts in conjunction with the water passing down on the lower buckets and also supplies the vacuum induced in the wheel by the centrifugal force and discharge of the water, and also helps produce the curved current of the water as it passes from the upper to the lower buckets of the wheel, by which improvements I am enabled to get more power from a given head of water than can be obtained by the use of any other wheel with which I am acquainted, the wheel acting efficiently in backwater or when submerged or placed under water.

Figure 1:
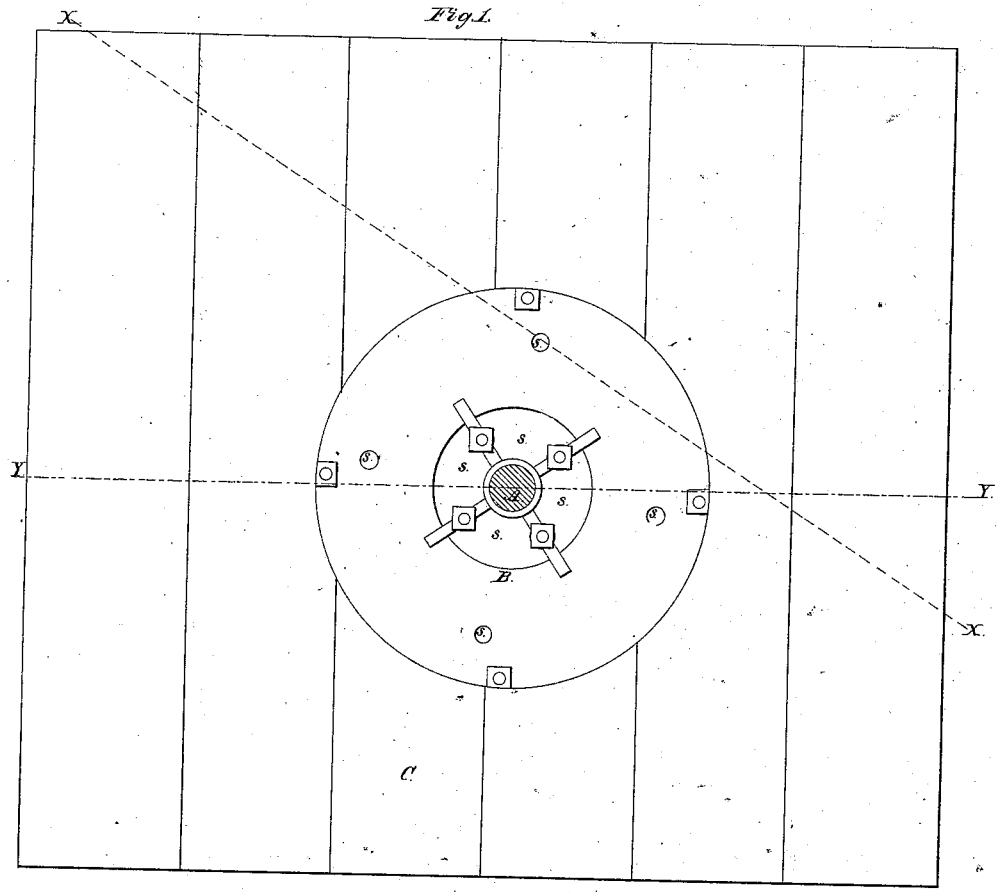
Figure 2:
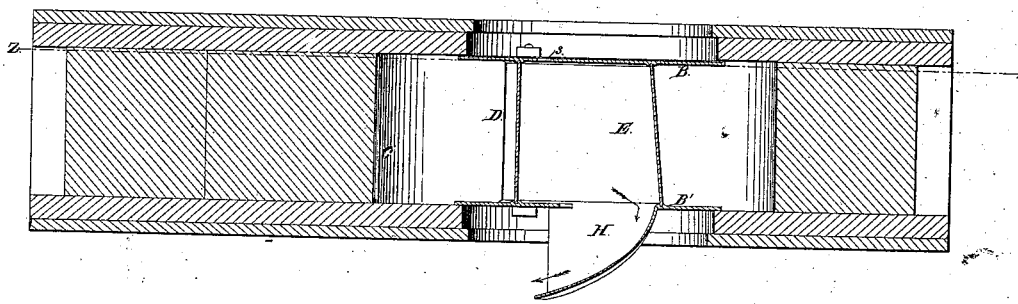
Figure 5:
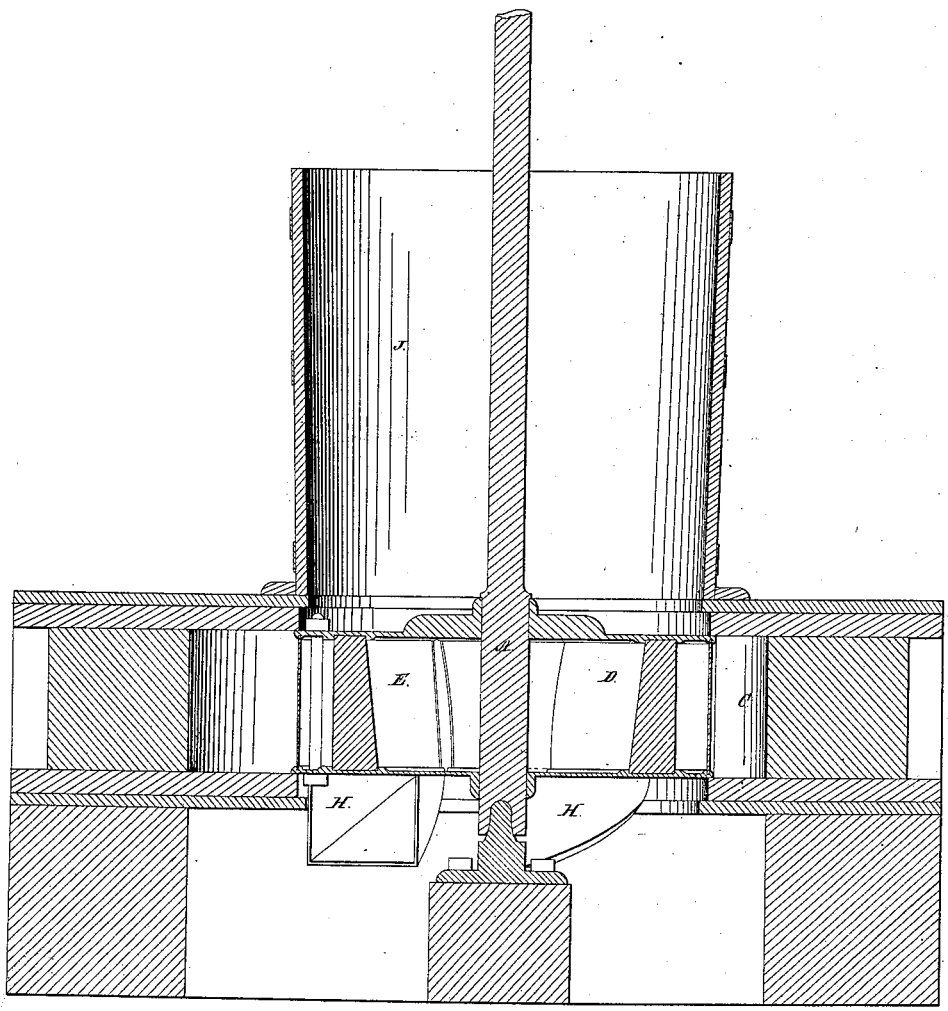

Figure 1 is a plan of said wheel and the curb in which it runs. Fig. 2 is an oblique vertical section of the wheel, divided at the line X X, the side of the line upon which the letters are placed being the side represented. Fig. 3 is a horizontal section below the line z z. Fig. 4 is a view of the under side of the wheel looking upward, it being represented as being used on a vertical shaft, though it is equally well adapted to being used on a horizontal one. Fig. 5 is a vertical section of the wheel back of the line Y Y, showing it as adapted to running under water on a vertical shaft. Fig. 6 is a vertical longitudinal section of a horizontal shaft with two wheels upon it also adapted to running under water.

A is the shaft of the wheel. B B' are two disks securely keyed on said shaft, the disk B being open at S S around the shaft for supplying the vacuum with air which the centrifugal force and discharge of the water forms in the wheel around the shaft, as more fully set forth below.

C is the curb, the water being introduced upon the wheel by what is termed a "scroll pitch."

D are buckets which receive the first action of the water upon the wheel, and which I usually make of cast-iron, as well as the disks B B' and the buckets E, F, and H. The only escape of the water from these buckets D is to pass toward the shaft of the wheel and thence toward the periphery of the wheel, as indicated by the direction of the arrows, which indicate the direction taken by the water throughout its operation upon the wheel. The water in passing toward the center of the wheel is forced in a curved current toward the periphery of the wheel, and continues in the line of curvature of the bucket E until it strikes the head of the bucket H with a direct action, and thence reacting on said bucket H as it leaves it, is discharged in a direction contrary to the revolution of the wheel. A powerful force, assisting in producing the curvature of the current of water as it leaves the inner end of the bucket D, is imparted by the strong draft of air through the tube J. This draft of air rushing into the wheel to supply the vacuum created as aforesaid, and assuming the natural lines of egress consistent with and induced by the arrangement of the wheel and its forces when in motion, acts upon those parts of the wheel over which it passes, producing in a greater or less degree the same effect as the water, thus giving additional force to the action of the water in its discharge over the buckets H.

One of the objects of the buckets E is to keep the water out to the periphery of the wheel until it acts upon the buckets D. A portion of the buckets D and E are inclined inward toward the water at the top, as shown at *i* and *e*, for the purpose of giving the water a more direct action upon the buckets H H.

By this method of constructing the wheel the water is made to act directly upon the buckets D D and then flows round an easy curve previous to being discharged, and is made to act again directly upon the buckets H H, from which it is discharged in a direction contrary to the motion of the wheel, thus combining the advantages of the impact and turbine wheels more fully than they are combined in any other wheel now known.

Much difficulty is frequently experienced from "backwater," as it is termed, or, in other words, from the water in the tail-race of the mill, rising during seasons of high water so as to partially or wholly cover the wheel, and even wheels the buckets of which are so constructed as to leave the water without dipping are found to be by no means free from this objection. This difficulty, I find by experiments, is caused chiefly by the absence of a supply of air within the wheel to fill the vacuum that the centrifugal force of the water acting upon the wheel creates around the shaft, which vacuum when produced or created in a wheel (having no device for a proper supply of air) retards the motion and greatly diminishes the power of the wheel. To obviate this difficulty where it is liable to exist, I attach a tube J to the curb of the wheel and extend it into the open air above high-water mark, as in Fig. 5; or when the wheel is intended to run on a horizontal shaft I form a communication between the tube J and the open air by the tube K, the air being admitted into the center of the wheel through the holes S S in the disk B, as before intimated.

In Fig. 6 two wheels are shown on the same shaft, both ventilated by the same tube. The tubes may be made, perhaps as advantageously as in any other manner, of wooden staves put together like a common tub or barrel. By this arrangement I am enabled to place my wheels sufficiently low to use all the head when the water in the bulk-head is low, and find that my wheels so ventilated are very little affected by backwater.

The tube J may be attached to the disk B and revolve with it, when the wheel runs on a vertical shaft, provided it should under any circumstances be deemed advisable.

Having thus fully described my improved water-wheel, what I claim as my invention, and desire to secure, is as follows:

The ventilating water-wheels inclosed by a curb, scroll, or box by means of a tube communicating with the wheel or in any other manner substantially the same, in combination with the buckets H, D, E, and F, constructed and arranged in the manner and for the purpose herein set forth.

FREDERICK SMITH.

Witnesses:
JOHN G. EVENDEN,
THOMAS P. HOW.